US012730858B2

(12) United States Patent
Agrahari et al.

(10) Patent No.: US 12,730,858 B2
(45) Date of Patent: Sep. 8, 2026

(54) INCORPORATING FEEDBACK IN ANOMALY DETECTION PERFORMED BY UNSUPERVISED LEARNING

(71) Applicant: Oracle Financial Services Software Limited, Mumbai (IN)

(72) Inventors: Shivam Agrahari, Bansi (IN); Shubham Negi, Bilaspur (IN); Veresh Jain, Bangalore (IN)

(73) Assignee: Oracle Financial Services Software Limited, Mumbai (IN)

( * ) Notice: Subject to any disclaimer, the term of this patent is extended or adjusted under 35 U.S.C. 154(b) by 598 days.

(21) Appl. No.: 18/366,721

(22) Filed: Aug. 8, 2023

(65) Prior Publication Data

US 2025/0053620 A1 Feb. 13, 2025

(51) Int. Cl.
*G06F 18/2431* (2023.01)
*G06F 18/21* (2023.01)

(52) U.S. Cl.
CPC ...... *G06F 18/2431* (2023.01); *G06F 18/2178* (2023.01)

(58) Field of Classification Search
CPC .................................................. G06F 18/2431
See application file for complete search history.

(56) References Cited

U.S. PATENT DOCUMENTS

| | | | | |
|---|---|---|---|---|
| 9,367,765 | B2 * | 6/2016 | Duckett | G06V 10/771 |
| 12,117,831 | B2 * | 10/2024 | Chowdhary | G06V 20/188 |
| 12,294,601 | B2 * | 5/2025 | Omkar | H04L 63/1425 |
| 2019/0279112 | A1 * | 9/2019 | Jaenisch | G06F 18/2433 |
| 2021/0014102 | A1 * | 1/2021 | Singh | H04L 41/142 |
| 2024/0126258 | A1 * | 4/2024 | Chowdhary | G06F 18/2178 |

* cited by examiner

*Primary Examiner* — Simon P Kanaan
(74) *Attorney, Agent, or Firm* — IPHORIZONS PLLC; Narendra Reddy Thappeta

(57) ABSTRACT

According to an aspect, a system performs a first machine learning (ML) technique and a second ML technique on a large set of data items. The first ML technique identifies a primary cluster containing data items classified as non-anomalous, with the rest of the data items classified as anomalous. The second ML technique identifies a set of secondary clusters. Upon receiving feedback on the classification of at least some of the data items, the system maintains a feedback data associating the feedback with each secondary cluster. Upon receiving an indication to find a classification of a data item, the system identifies as a result, whether the data item is non-anomalous or anomalous based on whether the data item belongs to the primary cluster or not. The system also determines based on a secondary cluster to which the data item belongs and the feedback associated with the secondary cluster, whether the result is to be modified. If the result is to be modified, the system reverses the result (from anomalous to non-anomalous and vice versa). The system then provides the result as the classification for the data item.

20 Claims, 10 Drawing Sheets

550
565

```
{
"clusters" :
[{
"cluster_id" : 2,
"number_datapoints" : 101,
"customer_label" : {
"0" : 10,
"1" : 1
},
"original_label" : 1
},{
"cluster_id" : 3,
"number_datapoints" : 75,
"customer_label" : {
"0" : 2,
"1" : 0
},
"original_label" : 1
},{
"cluster_id" : 4,
"number_datapoints" : 15,
"customer_label" : {
"0" : 0,
"1" : 6
},
"original_label" : 0
}]
}
```

INCORPORATING FEEDBACK IN ANOMALY DETECTION PERFORMED BY UNSUPERVISED LEARNING

BACKGROUND OF THE DISCLOSURE

Technical Field

The present disclosure relates to machine learning techniques, and more particularly to improving unsupervised machine learning techniques by incorporating feedback in anomaly detection.

Related Art

Anomaly detection commonly refers to identification of exception values which deviate significantly from other values in a data set of interest. The values (referred herein as data items) of the data set may be collected over a long duration prior to performing such detection.

Unsupervised learning is often used to perform anomaly detection. As is well known, unsupervised learning refers to usage of machine learning (ML) techniques to analyze and cluster values of a data set. These techniques help discover hidden patterns or data groupings in a given set of data items without the need for human intervention.

Thus, unsupervised learning is not designed for incorporating any feedback that may be available from users. Aspects of the present disclosure are directed to incorporating feedback in anomaly detection performed by unsupervised learning.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
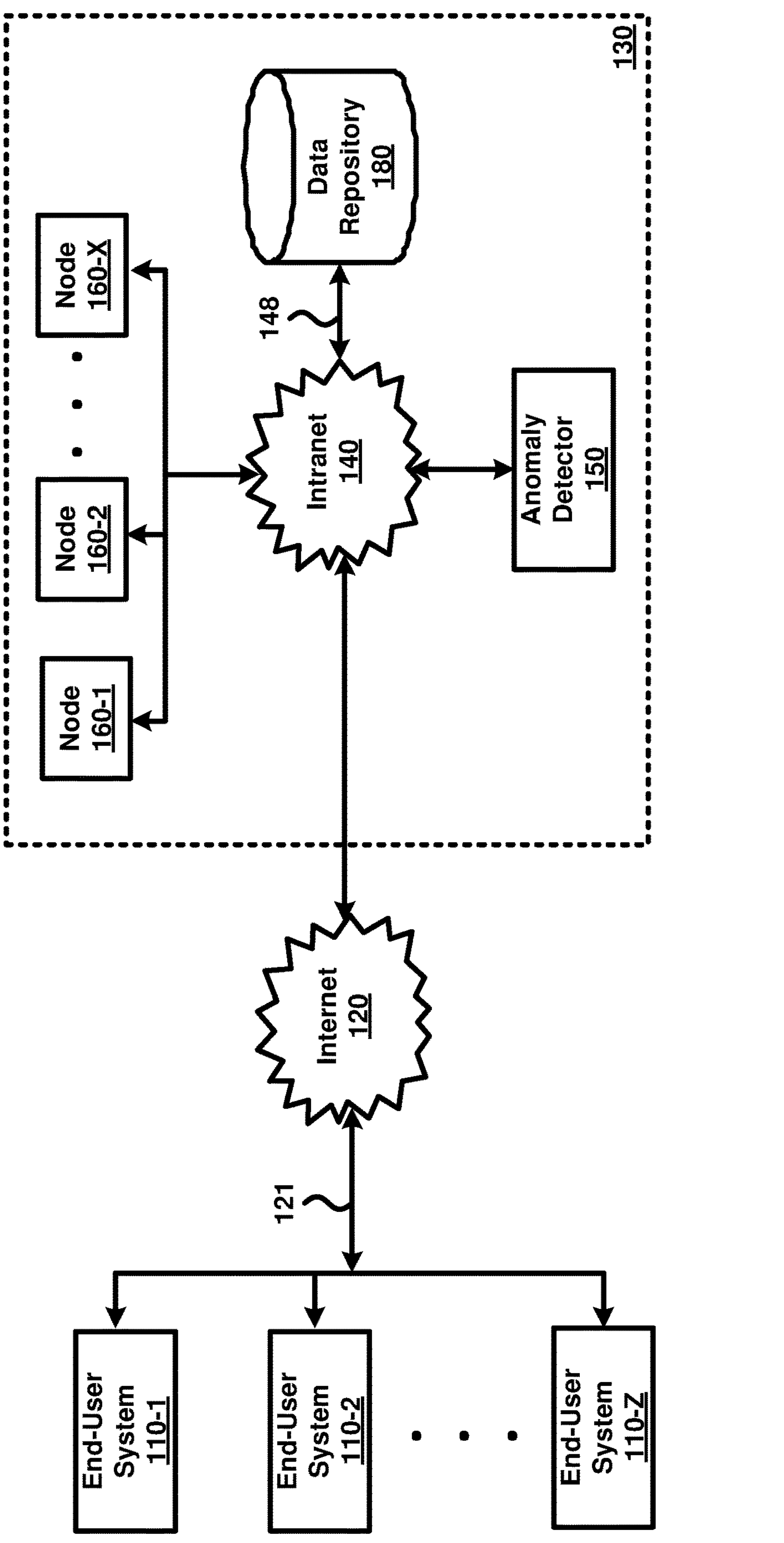
FIG. 1 is a block diagram illustrating an example environment (computing system) in which several aspects of the present disclosure can be implemented.

The present disclosure relates generally to using artificial intelligence techniques for anomaly detection. More specifically and without limitation, techniques disclosed herein relate to a novel approach for improving unsupervised machine learning techniques by incorporating feedback in such anomaly detection performed using unsupervised learning.

Aspects of the present disclosure are directed to incorporating feedback in anomaly detection performed by unsupervised learning. In one embodiment, a digital processing system performs a first machine learning (ML) technique and a second ML technique on a large set of data items. The first ML technique identifies a primary cluster containing data items classified as non-anomalous, with the rest of the data items classified as anomalous. The second ML technique identifies a set of secondary clusters. Upon receiving feedback on the classification of at least some of the large set of data items, the system maintains a feedback data associating the feedback with each secondary cluster of the set of secondary clusters.

Upon receiving an indication to find a classification of a data item of the large set of data items, the system identifies as a result, whether the data item is non-anomalous or anomalous based on whether the data item belongs to the primary cluster or not. The system also determines based on a secondary cluster to which the data item belongs and the feedback associated with the secondary cluster, whether the result is to be modified. If the result is to be modified and the result is non-anomalous, the system changes the result from non-anomalous to anomalous, and if the result is to be modified and the result is anomalous, the system changes the result from anomalous to non-anomalous. The system then provides the result as the classification for the data item.

According to another aspect of the present disclosure, the first ML technique is an unsupervised machine learning technique, wherein the maintaining, the determining and the changing together operate to incorporate feedback into the classification while using the unsupervised machine learning technique.

According to one more aspect of the present disclosure, the second ML technique operates to identify secondary clusters of smaller count of data items compared to the count of data items in the primary cluster.

According to yet another aspect of the present disclosure, the feedback (noted above) is received from one or more users. The first indication is in the form of a request received from a user using an end user system.

According to an aspect of the present disclosure, the system (noted above) maintains for each of the set of secondary clusters, respective counts of anomalous and non-anomalous data items in the secondary cluster determined based on the feedback. Upon receiving the indication noted above, the system computes a ratio of the respective counts of the secondary cluster (to which the data item belongs) to the total number of data items belonging to the secondary cluster and checks whether the ratio is above a threshold. The system then determines that the result is to be modified if the ratio is above or equal to the threshold and that the result is not to be modified otherwise.

According to another aspect of the present disclosure, upon receiving another indication that a new data item has been added to the large set of data items, the system uses the first ML technique to determine whether the new data item belongs to the primary cluster and then uses the second ML technique to determine a second secondary cluster to which the new data item belongs. The system then updates the feedback data (noted above) to include the new data item. As such, new data items are enabled to be added without performing the first ML technique on the large set of data items again.

According to one more aspect of the present disclosure, the system checks whether the second secondary cluster is contained in the set of secondary clusters (previously identified by using the second ML technique on the large set of data items). If the second secondary cluster is not contained in the set of secondary clusters, the system adds the second secondary cluster to the set of secondary clusters. The system then adds the second data item to the second secondary cluster.

According to yet another aspect of the present disclosure, the system determines that the new data item causes the second secondary cluster to be merged with a third secondary cluster. The system merges the third secondary cluster with the second secondary cluster and adds the new data item to the merged second secondary cluster.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-Z (Z representing any natural number), Internet 120, and computing infrastructure 130. Computing infrastructure 130 in turn is shown containing intranet 140, nodes 160-1 through 160-X (X representing any natural number), and anomaly detector 150. The end-user systems and nodes are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Computing infrastructure 130 is a collection of nodes (160) that may include processing nodes, connectivity infrastructure, data storages, administration systems, etc., which are engineered to together host software applications. Computing infrastructure 130 may be a cloud infrastructure (such as Amazon Web Services (AWS) available from Amazon.com, Inc., Google Cloud Platform (GCP) available from Google LLC, etc.) that provides a virtual computing infrastructure for various customers, with the scale of such computing infrastructure being specified often on demand.

Alternatively, computing infrastructure 130 may correspond to an enterprise system (or a part thereof) on the premises of the customers (and accordingly referred to as "On-prem" infrastructure). Computing infrastructure 130 may also be a "hybrid" infrastructure containing some nodes of a cloud infrastructure and other nodes of an on-prem enterprise system.

Intranet 140 provides connectivity between nodes 160 and performance manger 150. Internet 120 extends the connectivity of these (and other systems of computing infrastructure 130) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in computing infrastructure 130. A user request can be a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Some of nodes 160 may be implemented as corresponding data stores. Each data store represents a non-volatile (persistent) storage facilitating storage and retrieval of data by software applications executing in the other systems/nodes of computing infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of the nodes 160 may be implemented as corresponding server systems. Each server system represents a server, such as a web/application server, constituted of appropriate hardware executing software applications capable of performing tasks requested by end-user systems 110. In general, a server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

In one embodiment, a banking entity deploys desirable software applications in one or more nodes 160 of computing infrastructure 130. The software applications provide various online banking services (e.g., loans, credit cards, etc.) to customers of the banking entity (using end user systems 110). The banking entity in turn provides bills/banking statements for the banking services availed by each customer. Some of the customers may be corporate customers with the banking statements for such a corporate customer including the banking services availed by employees of the corporate customer.

Data repository 180 represents a non-volatile storage (similar to data store noted above) that stores desired data sets that need to be analyzed for anomalies. The data sets (specifically the data items therein) can be generated by operation in different environments. In an embodiment, a data set contains various bank statements/bills (generated and sent by the banking entity to its customers), which individually need to be classified as anomalous or non-anomalous.

Anomaly detector 150 is a computing system (similar to server system noted above) that performs anomaly detection by checking whether any of the values/data items in a data set of interest (stored in data repository 180) are anomalous (not as per normal) or not. In the banking embodiment noted above, it may be appreciated that a bank statement identified as being anomalous indicates that the banking statement has been incorrectly generated or otherwise requires manual/different processing.

In one embodiment, anomaly detector 150 uses unsupervised learning techniques (using the appropriate machine learning (ML) techniques/models) to detect whether the received data items are anomalous or not. Examples of such unsupervised learning techniques are, but not limited to, affinity propagation, agglomerative clustering, BIRCH (Balanced Iterative Reducing and Clustering using Hierarchies), DBSCAN (Density-Based Spatial Clustering of Applications with Noise), K-Means, Mean Shift, OPTICS (Ordering Points To Identify the Clustering Structure), Spectral Clustering and Mixture of Gaussians, as is well known in the arts.

However, it may be desirable to incorporate feedback provided by users (e.g., customers of the banking entity, employees of the customers, etc.) into such unsupervised learning. For example, banking entities may not desire to create new feedback-based models using appropriate supervised learning ML techniques or change an existing working model (operating in anomaly detector 150). Instead, the banking entities may wish to make only incremental changes in the existing working models. In addition, it may be costly (in terms of hardware and software) to first implement a methodology of detecting anomalies using unsupervised learning techniques and later shifting to supervised learning techniques with enough customer feedback.

Anomaly detector 150, extended according to several aspects of the present disclosure, facilitates incorporation of feedback in the anomaly detection performed by unsupervised learning as described below with examples.

Figure 2:
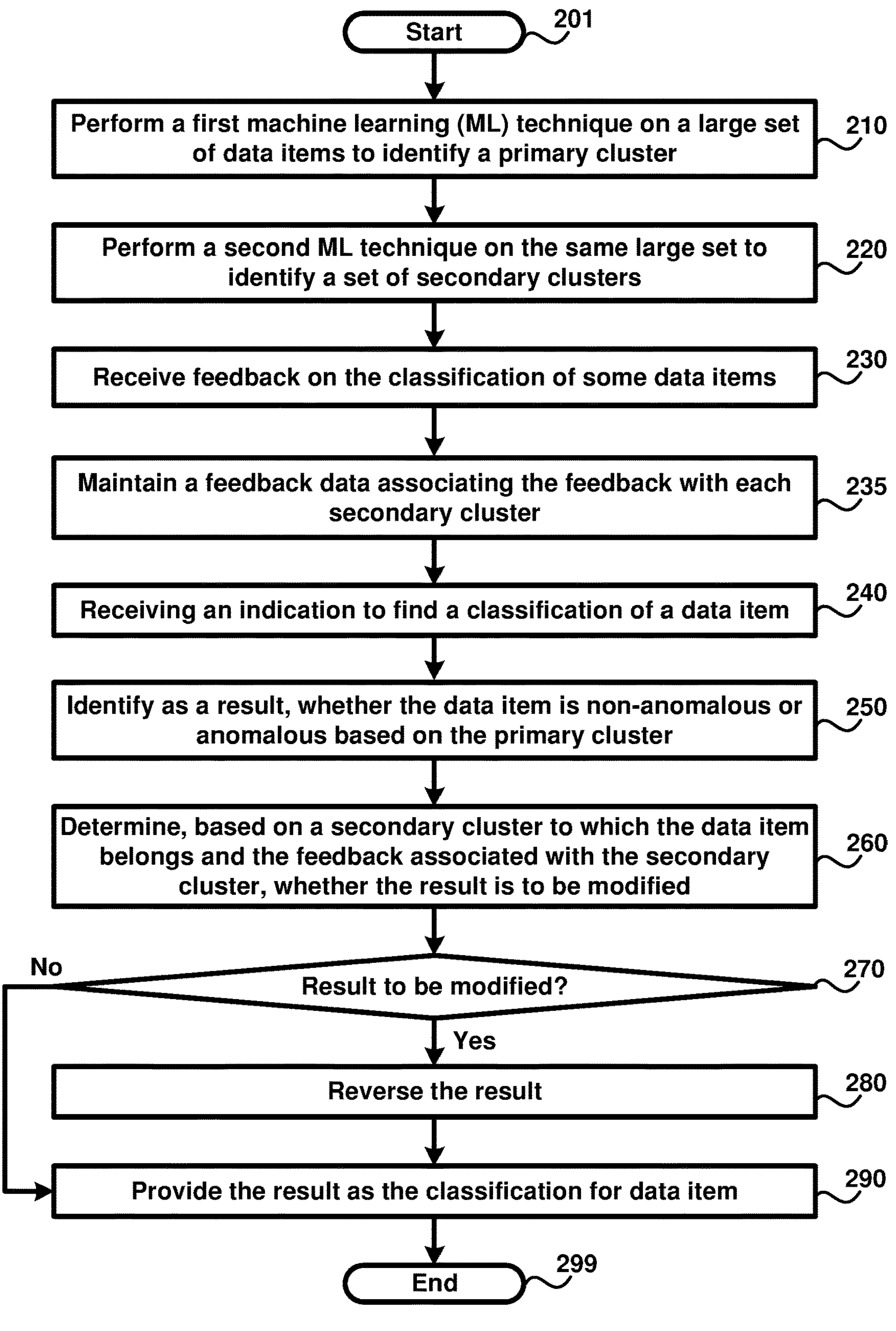
FIG. 2 is a flow chart illustrating the manner in which feedback is incorporated in anomaly detection performed by unsupervised learning, according to aspects of the present disclosure.

3. Incorporating Feedback in Anomaly Detection Performed by Unsupervised Learning FIG. 2 is a flow chart illustrating the manner in which feedback is incorporated in anomaly detection performed by unsupervised learning, according to aspects of the present disclosure. The flowchart is described with respect to the systems of FIG. 1, in particular anomaly detector 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, anomaly detector 150 performs a first machine learning (ML) technique on a large set of data items to identify a primary cluster containing data items classified as non-anomalous, with the rest of the data items classified as anomalous. The large set of data items may be values characterizing the operation of node 160 when processing user requests and may be received from nodes 160. According to an aspect, the first ML technique may be any one of the unsupervised clustering techniques noted above.

In step 220, anomaly detector 150 performs a second ML technique on the same large set to identify a set of secondary clusters. The second clustering technique may also be any one of the unsupervised clustering techniques noted above. According to an aspect, the second clustering technique operates to identify secondary clusters of smaller count of data items compared to the count of data items in the primary cluster noted above.

In step 230, anomaly detector 150 receives feedback on the classification of some data items of the large set of data items. The feedback may indicate whether a previous result of classification of a data item is correct or incorrect. Alternatively, or in addition, the feedback may indicate whether the data item is anomalous or non-anomalous. Such feedback may be received from one or more users using end user systems 110.

In step 235, anomaly detector 150 maintains a feedback data associating the feedback received with each secondary cluster of the set of secondary clusters. The feedback data may be maintained in a non-volatile storage such as a hard disk internal to anomaly detector 150 or an external data store (one of nodes 160). The feedback data may be maintained in any convenient format.

In step 240, anomaly detector 150 receives an indication to find a classification of a data item of the large set of data items. The indication may be received in response to anomaly detector 150 receiving a request for the classification of a data item. Such a request may be received from a user using one of end user systems 110. Alternatively, the indicating may be received as part of anomaly detector 150 performing anomaly detection on the large set of data items.

In step 250, anomaly detector 150 identifies as a result, whether the data item is non-anomalous or anomalous based on the primary cluster. In particular, anomaly detector 150 checks whether the data item belongs to the primary cluster or not and sets the result accordingly, that is result is set to non-anomalous if the data item belongs to the primary cluster and result is set to anomalous otherwise.

It may be appreciated that the manner in which a data item is determined to "belong" to a cluster may be determined in a known way well known in the relevant arts. For example, the data item is determined to belong to the cluster if the data item is closer to (proximal to) other data items in the cluster as compared to the data items outside the cluster.

In step 260, anomaly detector 150 determines, based on a secondary cluster to which the data item belongs and the feedback associated with the secondary cluster, whether the result is to be modified. Broadly, the result is determined to be modified only when a large amount of feedback contradicts a current value of the result. For example, if the current value of the result (set in step 250) is non-anomalous, but the large amount of feedback indicates that the data item is actually anomalous, the result is determined to be modified and vice versa.

According to an aspect, anomaly detector 150 maintains (in step 240) for secondary cluster, respective counts of anomalous and non-anomalous data items in the secondary cluster determined based on the feedback. Upon receiving the indication, anomaly detector 150 computes a ratio of the respective counts of the secondary cluster (to which the data item belongs) to the total number of data items belonging to the secondary cluster and checks whether the ratio is above a threshold. Anomaly detector 150 then determines that the result is to be modified if the ratio is above or equal to the threshold and that the result is not to be modified otherwise.

In step 270, anomaly detector 150 checks whether the result is to be modified (as determined in step 260). Control passes to step 280 if the result is to be modified and to step 290 otherwise.

In step 280, anomaly detector 150 reverses the result in view of step 260 determining that the result is to be modified. Reversing of the result entails changing the result to anomalous if the current value of the result is non-anomalous and to non-anomalous if the current values of the result is anomalous. Control then passes to step 290.

In step 290, anomaly detector 150 provides the result as the classification for data item. In the scenario that the indication of step 240 is received as a request from a user using one of end user systems 110, providing may entail sending the result as a response to the request to the requesting end user system, which in turn may display the result to the user. Alternatively, if the indication is received as part of performance of anomaly detection, anomaly detector 150 uses the result provided in step 290 to perform anomaly detection (instead of the output of an unsupervised learning technique as noted above). Control passes to step 299, where the flowchart ends.

It may be appreciated that the first ML technique may be an unsupervised machine learning technique, wherein the steps of maintaining, determining, and reversing/changing (noted above0 together operate to incorporate feedback into the classification while using the unsupervised machine learning technique. Anomaly detector 150 extended according to several aspect of the present disclosure consists of an unsupervised machine learning technique modified to include customer feedback thus preventing the altogether shift to a supervised model at a later stage. In other words, the features disclosed herein relate to a novel approach for improving unsupervised machine learning techniques by incorporating feedback in anomaly detection.

The manner in which anomaly detector 150 is implemented to provide several aspects of the present disclosure according to the steps of FIG. 2 is illustrated below with examples.

4. Anomaly Detector

Figure 3:
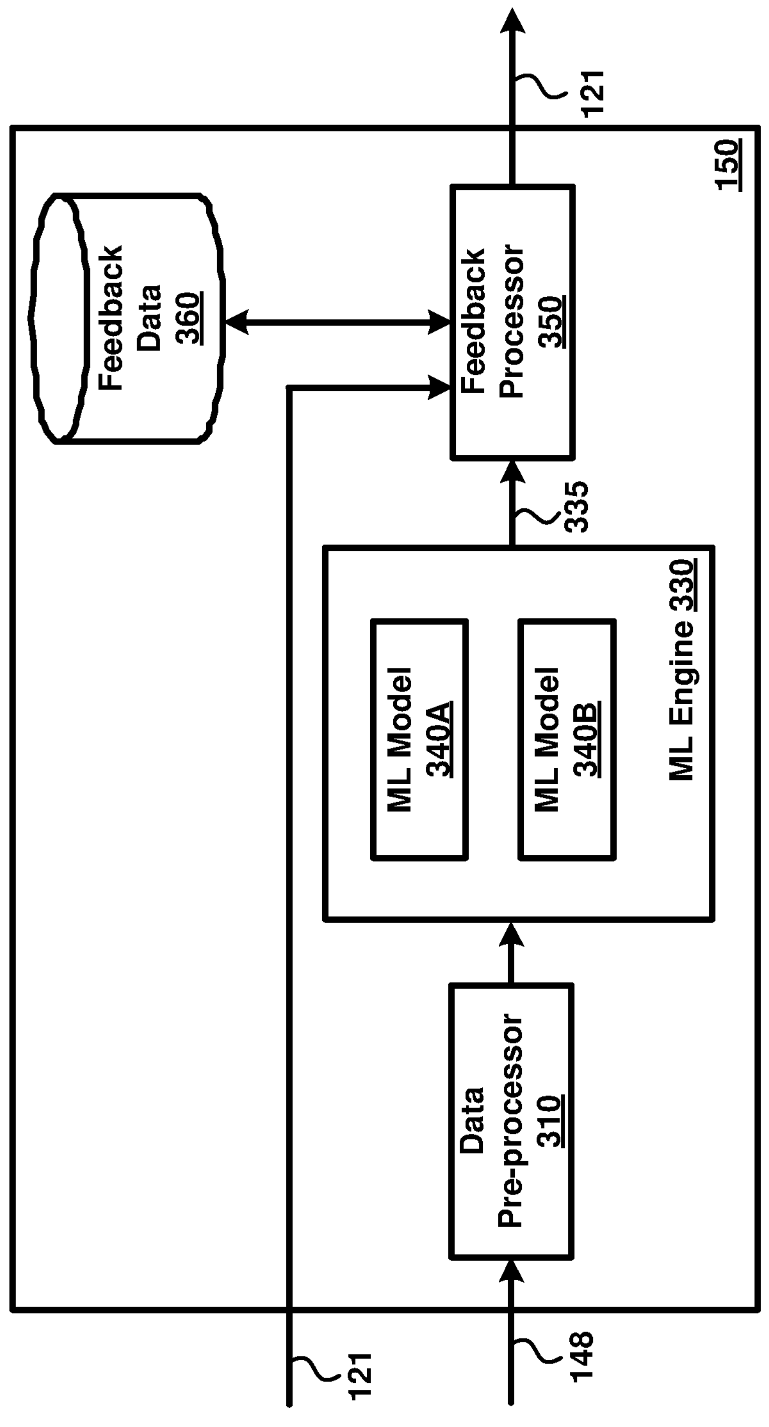
FIG. 3 is a block diagram of an anomaly detector according to several aspects of the present disclosure.

FIG. 3 is a block diagram of an anomaly detector (150) according to several aspects of the present disclosure. The block diagram is shown containing data pre-processor 310, machine learning (ML) engine 330 (in turn, shown containing machine learning (ML) models 340A and 340B), feedback processor 350, and feedback data store 360. Each of the blocks in the Figure is described in detail below.

Data pre-processor 310 receives (via path 148) a data set of interest such as banking statements from data repository 180, performs pre-processing on the data items contained in the data set and forwards the processed data items to ML engine 330. Pre-processing includes but is not limited to removing incorrect/incomplete data, discretization of data, normalization of data, identification of feature set, etc. as is well known in the relevant arts.

ML engine 330 generates and maintains various models that collate the data received from data pre-processor 310. The models may be generated using any machine learning approach such as the one or more unsupervised machine learning techniques noted above. Various other machine learning approaches can be employed, as will be apparent to skilled practitioners, by reading the disclosure provided herein.

Each of ML models 340A and 340B performs clustering of the large set of data items forwarded by data pre-processor 310 (or by accessing the data tables stored in ODR 320). Each of models 340A and 340B is generated using unsupervised ML techniques noted above. In one embodiment, density-based clustering techniques such as DBSCAN (Density-Based Spatial Clustering of Applications with Noise) is used to generate ML models 340A and 340B. It may be appreciated that the same or different clustering techniques may be used for generating ML models 340A and 340B.

ML model 340A identifies a primary cluster containing data items classified as non-anomalous, with the rest of the data items classified as anomalous. On the other hand, ML model 340B identifies a set of secondary clusters, with each secondary cluster containing smaller count of data items compared to the count of data items in the primary cluster.

Figure 4A:
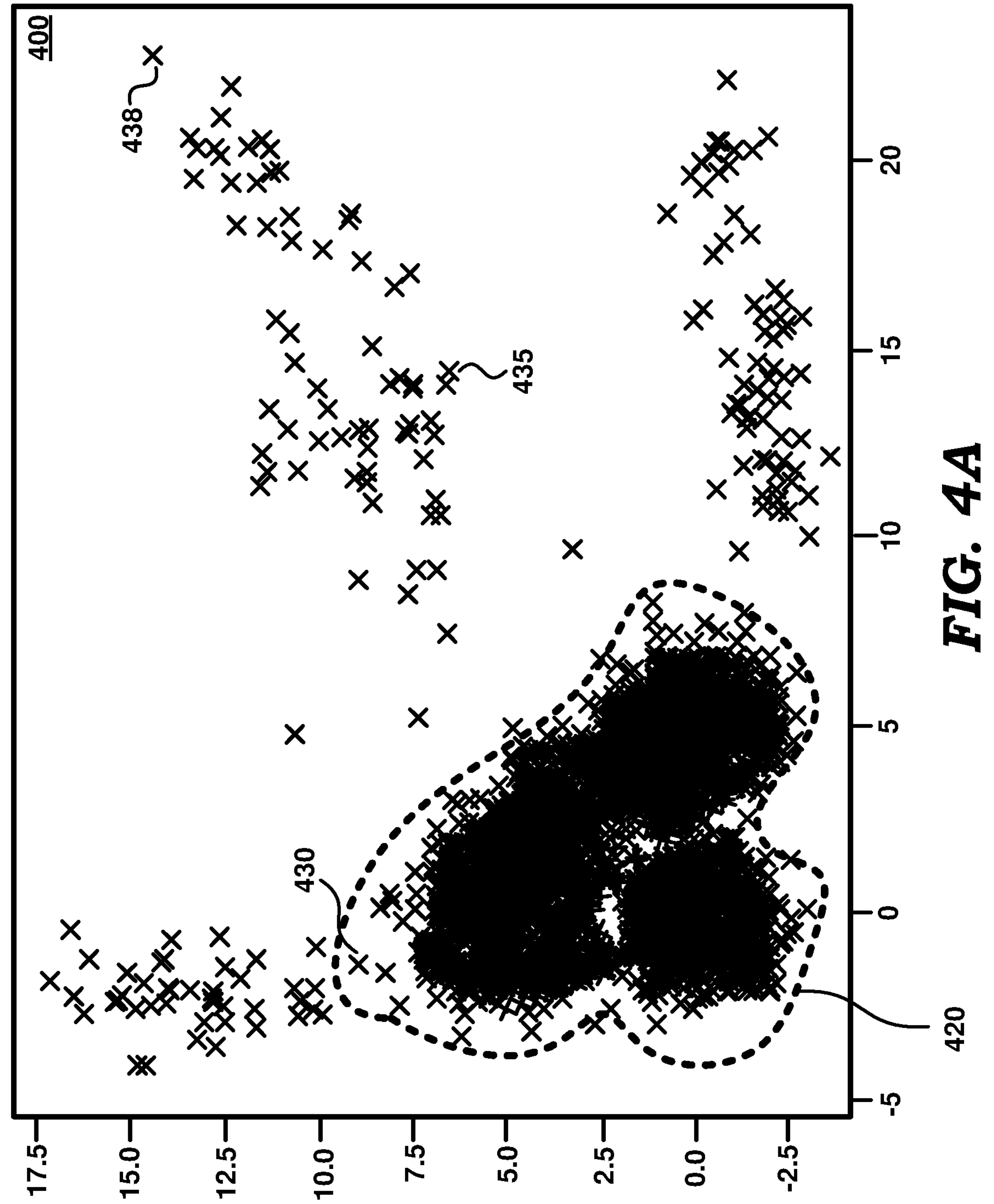
FIGS. 4A and 4B depict graphical representations of clustering performed using unsupervised learning techniques in one embodiment.
Figure 4B:
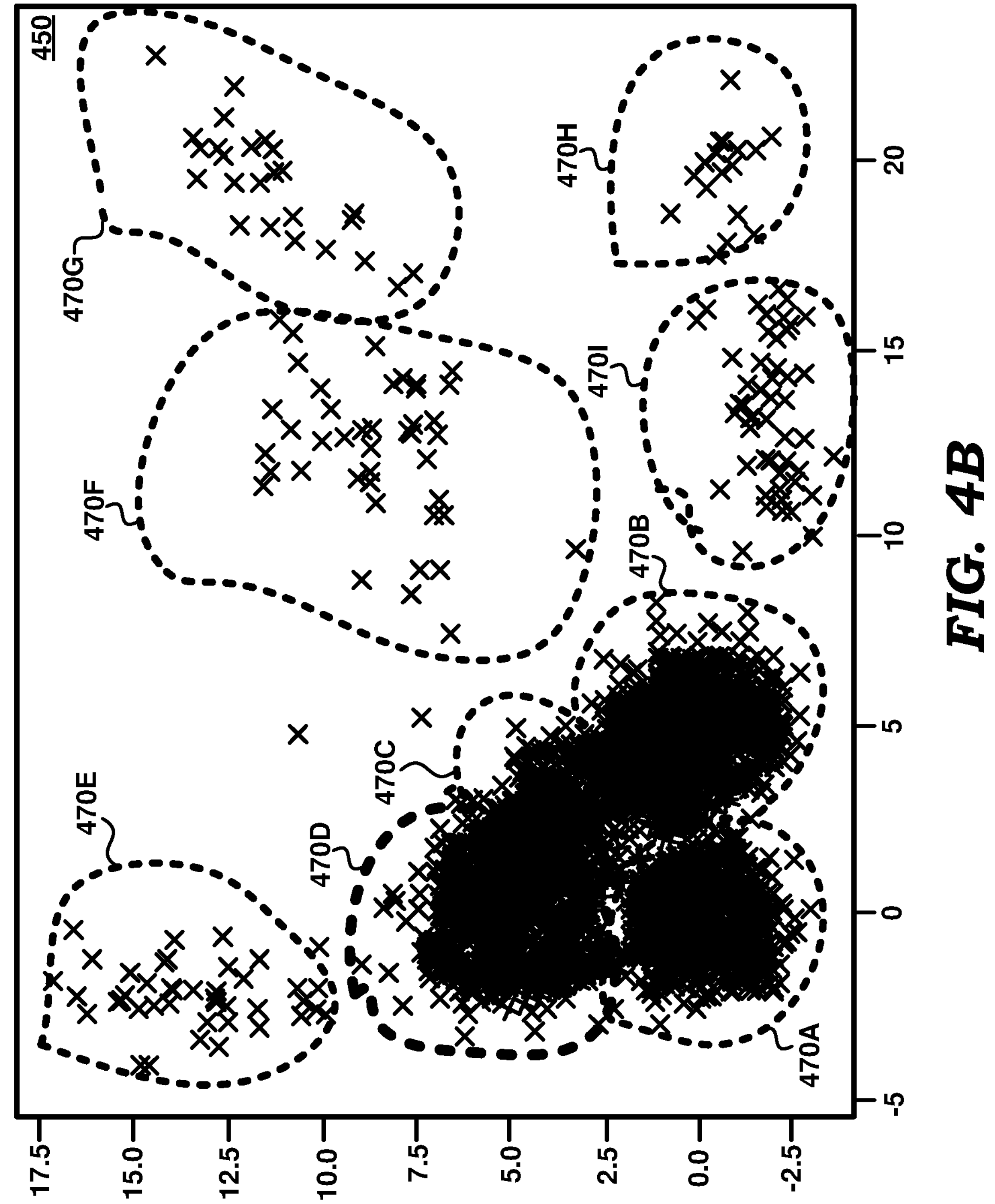

FIGS. 4A and 4B depict graphical representations of clustering performed using unsupervised learning techniques in one embodiment. While graph 400 depicts clustering performed in ML model 340A, graph 450 depicts clustering performed in ML model 340B. Each of the data items is shown as a corresponding "X" in the graphs. Suitable axes such as characteristics of the data items, identified feature set, etc. may be chosen for displaying the data items in the graphs, as will be apparent to a person skilled in the relevant arts.

Graph 400 (generated by ML model 340A) depicts a primary cluster 420 of data items. As noted above, any data item (such as 430) contained in primary cluster 420 is classified as non-anomalous, with the rest of the data items (such as 435, 438) classified as anomalous. Graph 450 (generated by ML model 340B) depicts a set of secondary clusters 470A-470I, each secondary cluster containing a corresponding set of data items.

It should be noted that the set of secondary clusters 470A-470I shown in graph 450 is not used for identifying anomalies, but used to change the anomalies/non-anomalies determined using primary clustering (ML model 340A). It may be observed that primary cluster 420 appears to be shown spilt into multiple secondary clusters 470A-470D. However, such a scenario may not be always true when the two different clusters/graphs are generated using two different/separate ML techniques.

Referring again to FIG. 3, anomaly detector 150, in particular ML model 340A implemented using an unsupervised ML technique, performs anomaly detection based on primary cluster 420 and forwards the results to feedback processor 350. Feedback processor 350 provided according to aspects of the present disclosure incorporates user feedback into the anomaly detection performed by unsupervised learning (ML model 340A). The manner in which feedback processor 350 maintains user feedback is described below with examples.

5. Maintaining User Feedback

Feedback processor 350 receives (via path 121) feedback on the classification of some data items of the large set of data items. Such feedback may be received from one or more users using end user systems 110. The feedback may indicate whether a previous result of classification of a data item is correct or incorrect. In one embodiment, the feedback indicates whether a data item is anomalous or non-anomalous.

Feedback processor 350 then maintains in feedback data store 360, a feedback data associating the feedback received with each secondary cluster of the set of secondary clusters (such as 470A-470I). In one embodiment, feedback processor 350 maintains respective counts of anomalous and non-anomalous data items in each secondary cluster determined based on the feedback.

Feedback data store 360 represents a non-volatile (persistent) storage facilitating storage and retrieval of data by feedback processor 350. In particular, feedback data store 360 maintains portions of feedback data that enable the operation of various aspects of the present disclosure. The manner in which feedback data may be maintained in feedback data store 360 is described in detail below.

Figures 5A, 5B:
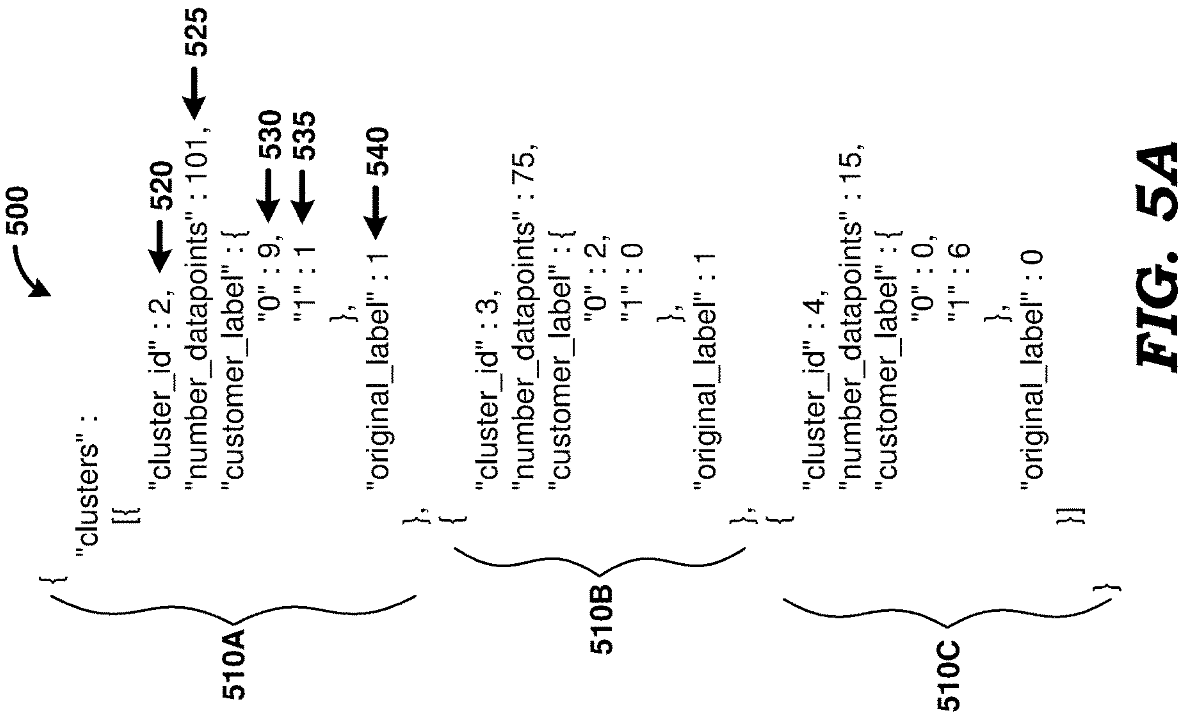
FIG. 5 depicts the manner in which feedback data is maintained in one embodiment.

FIGS. 5A and 5B depicts the manner in which feedback data is maintained in one embodiment. Though shown as being received/maintained in JavaScript Object Notation (JSON) format, the feedback data (of FIGS. 5A-5B and 6A-7C) may be received/maintained according to other data formats (such as extensible markup language (XML), etc.) and/or using other data structures (such as tables, lists, trees, etc.), as will be apparent to one skilled in the relevant arts by reading the disclosure herein.

Data portion 500 of FIG. 5A depicts a portion of the feedback data maintained in feedback data store 360. Data portions 510A-510C depict the details of three secondary clusters of the set of secondary clusters (such as 470A-470I). Data portion 520 indicates an identifier of cluster 510A, while data portion 525 indicates the total number of data items in cluster 510A. Data portions 530 and 535 respectively indicate the number of data items in cluster 510A tagged by users (as part of feedback received) as anomalous (value "0") or non-anomalous (value "1"). Data portion 540 indicates the original label (anomalous (value "0") or non-anomalous (value "1")) associated with cluster 510A which is output as a result of primary clustering. Similarly, the details of other clusters may be maintained as part of feedback data.

It may be appreciated that to the feedback data of data portion 500 includes information from primary clustering (provided by ML model 340A to feedback processor 350), details of the secondary clusters (provided by ML model 340B to feedback processor 350) and the user feedback received from end user systems 110.

Thus, feedback processor 350 receives user feedback from end user systems 110 and maintains the received feedback associated with the corresponding secondary clusters in feedback data store 360. The manner in which such maintained feedback is incorporated by feedback processor 350 into the anomaly detection performed by unsupervised learning (ML model 340A) is described below with examples.

6. Incorporating User Feedback

Referring again to FIG. 3, feedback processor 350 receives an indication to find a classification of a data item of interest (e.g., a bank statement). The indication may be received as part of a request received (via path 121) from end user systems 110 or from ML model 340A (via path 335) as part of anomaly detection. In response to the indication, feedback processor 350 first inspects the feedback data maintained in feedback data store 360 to determine the specific secondary cluster to which the data item of interest belongs. For example, feedback processor 350 may inspect data portion 500 and determine that the data item of interest belongs to secondary cluster 510A.

Feedback processor 350 then computes a ratio of the respective counts of the secondary cluster to which the data item belongs (that is cluster 510A) to the total number of data items belonging to the secondary cluster and checks whether the ratio is above a threshold. Feedback processor 350 then determines that a result of primary clustering (as indicated by data portion 540 or as received via path 335) is to be modified if the ratio is above or equal to the threshold and that the result is not to be modified otherwise. If feedback processor 350 determines that the result is to be modified, feedback processor 350 reverses the result (changes from anomalous to non-anomalous and vice versa).

In one embodiment, the above noted operations of feedback processor 350 are implemented as below (shown in pseudo code):

```
customer_label_proportion = abs(customer_label_difference) /
number_datapoints
IF (customer_label_proportion < reverse_coefficient) THEN
  RETURN original_label
ELSE
  RETURN (1 − original_label)
```

Where, customer_label_difference is the difference between the respective counts (data portions 530 and 535) of anomalous and non-anomalous data items in the secondary cluster (510A);

number_datapoints is the total number of data items (data portion 525) in the secondary cluster (510A);

customer_label_proportion is a variable calculated as a ratio of the respective counts of the secondary cluster to the total number of data items, abs ( ) being the absolute function that returns the absolute value of the input;

reverse_coefficient is a threshold to which the ratio is compared and may be specified as part of a configuration (for example, pre-defined as configuration data for anomaly detector 150). In the following disclosure, the value of reverse_coefficient is assumed to be 0.08; and original_label is the result (anomalous or non-anomalous) associated with the second cluster (610A) which is output as a result of primary clustering. It may be appreciated that the equation (1−original_label) reverses the original label value, since when the original label is "0" (anomalous), the equation generates the value "1" (non-anomalous) and when the original label is "1" (non-anomalous), the equation generates the value "0" (anomalous).

Thus, for the feedback data maintained for cluster 510A, feedback processor 350 computes the ratio customer_label_difference=abs (9−1)/101=8/101=0.079 and compares the ratio with the threshold reverse_coefficient=0.8. Since the ratio is less than the threshold, feedback processor 350 determines that the original_label is not to be modified. Accordingly, the original label 1 (="non-analogous") is provided by feedback processor 350 as the classification for the data item of interest. In one embodiment, feedback processor 350 sends (via path 121) the classification as a response to the request received from end user systems 110.

Data portion 550 of FIG. 5B depicts the feedback data of data portion 500 that has been updated with recent user feedback. It may be observed that data portion 580 has been updated in view of receiving user feedback that a data item contained in cluster 510A is anomalous. For cluster 560A, feedback processor 350 computes the ratio customer_label_difference=abs (10−1)/101=9/101=0.089 and compares the ratio with the threshold reverse_coefficient=0.8. Since the ratio is greater than the threshold, feedback processor 350 determines that the original_label is to be modified. Accordingly, the original label 1 (="non-analogous") is reversed to 0 (="analogous") and the reversed label (0) is provided by feedback processor 350 as the classification for the data item of interest.

From the above, it may be appreciated that the original label (which is the result of primary clustering) is modified only when there is substantive difference between the anomalous and non-anomalous counts of the secondary cluster. If the anomalous and non-anomalous counts of a secondary cluster are close to each other, the chance of the original label being modified is low.

Thus, anomaly detector 150 incorporates user feedback into the anomaly detection performed by unsupervised learning. It may be appreciated that new data items (bank statements) may be added to the data set of interest subsequent to processing the data set using the unsupervised ML techniques noted above (that is, after ML models 340A and 340B have been generated).

One approach is to perform the ML techniques with the new data set (containing the new data items) to again generate ML models 340A and 340B (referred to as re-training the models). In this regard it should be noted that the feedback incorporation is performed in the post-processing layer (that is after the primary cluster identifies whether a data item is anomalous or non-anomalous) and not the training layer. As such, re-training of the entire ML models 340A and 340B may make obsolete the feedback data collected so far and may necessitate new feedback data to be collected and maintained. The manner in which anomaly detector 150 facilitates additional of new data items to the data set while overcoming some of the drawbacks noted above as described below with examples.

7. Incremental Learning

Aspects of the present disclosure facilitate incremental learning so that training of the models 340A and 340B occurs with addition of each data item (that is incrementally) and no already present data item undergoes re-training. Accordingly, no re-training of previous models 340A and 340B is required to be performed and the same/previous feedback data is used to determine whether a result of primary clustering is to be reversed or not.

According to an aspect, anomaly detector 150 receives an indication that a new data item has been added to the large set of data items. The indication may be received from data repository 180. In response, anomaly detector 150 uses the first ML technique (used to generate ML model 340A) to determine whether the new data item belongs to the primary cluster and then uses the second ML technique (used to generate ML model 340B) to determine a second secondary cluster to which the new data item belongs. The system then updates the feedback data to include the new data item. As such, new data items are enabled to be added without performing the unsupervised ML technique on the large set of data items (data set) again.

Such incremental learning may result in three scenarios—(1) new data item can be assigned to an existing secondary cluster contained in the set of secondary clusters; (2) new data item can be assigned only to a new secondary cluster; (3) the addition of the new data item causes existing secondary clusters to be merged to form a new secondary cluster. The manner in which anomaly detector 150 handles these scenarios is described in detail below.

Figure 6A:
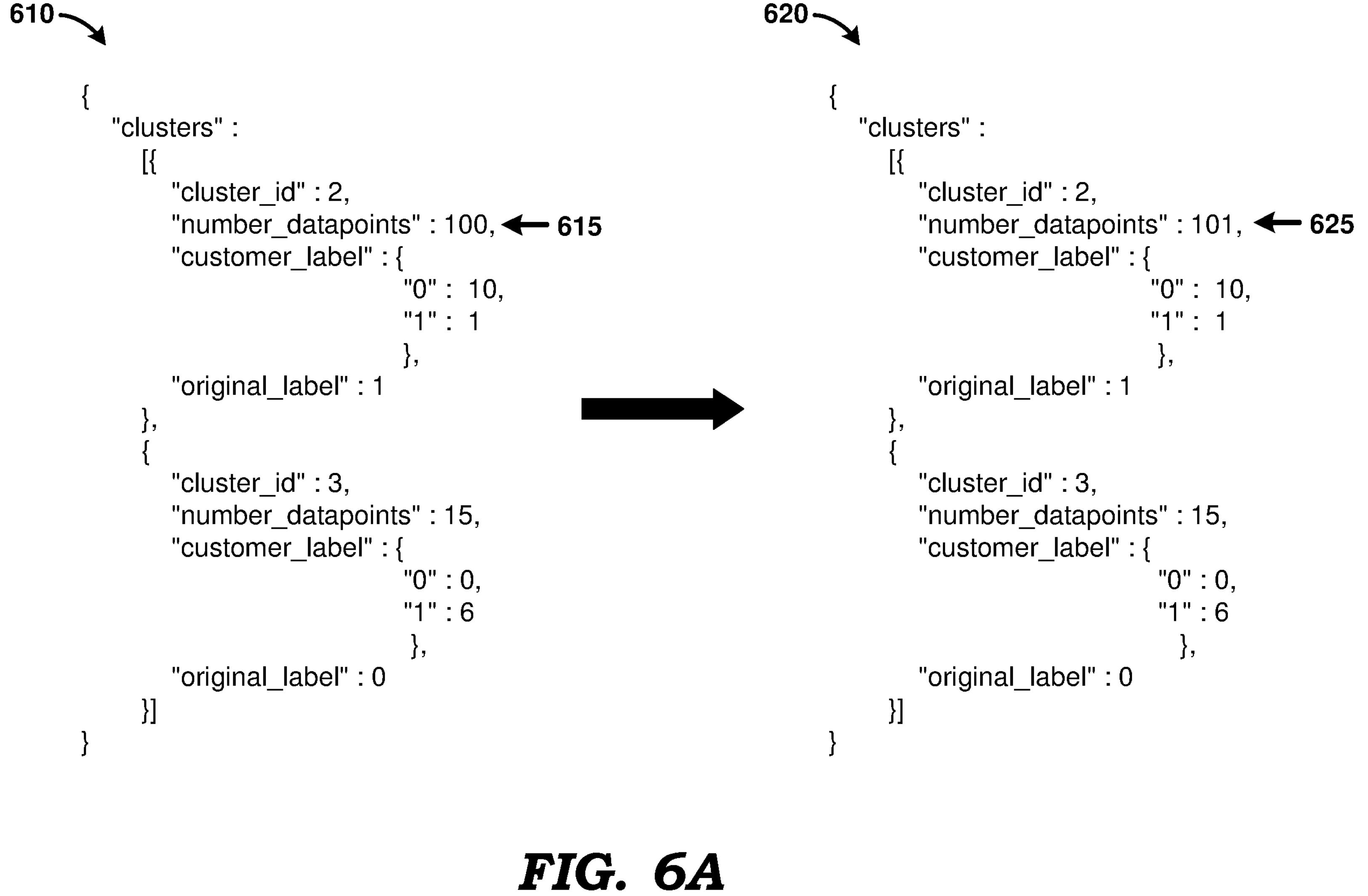
FIG. 6A-6C depicts the manner in which feedback data is updated when a new data item is added in one embodiment.
Figure 6B:
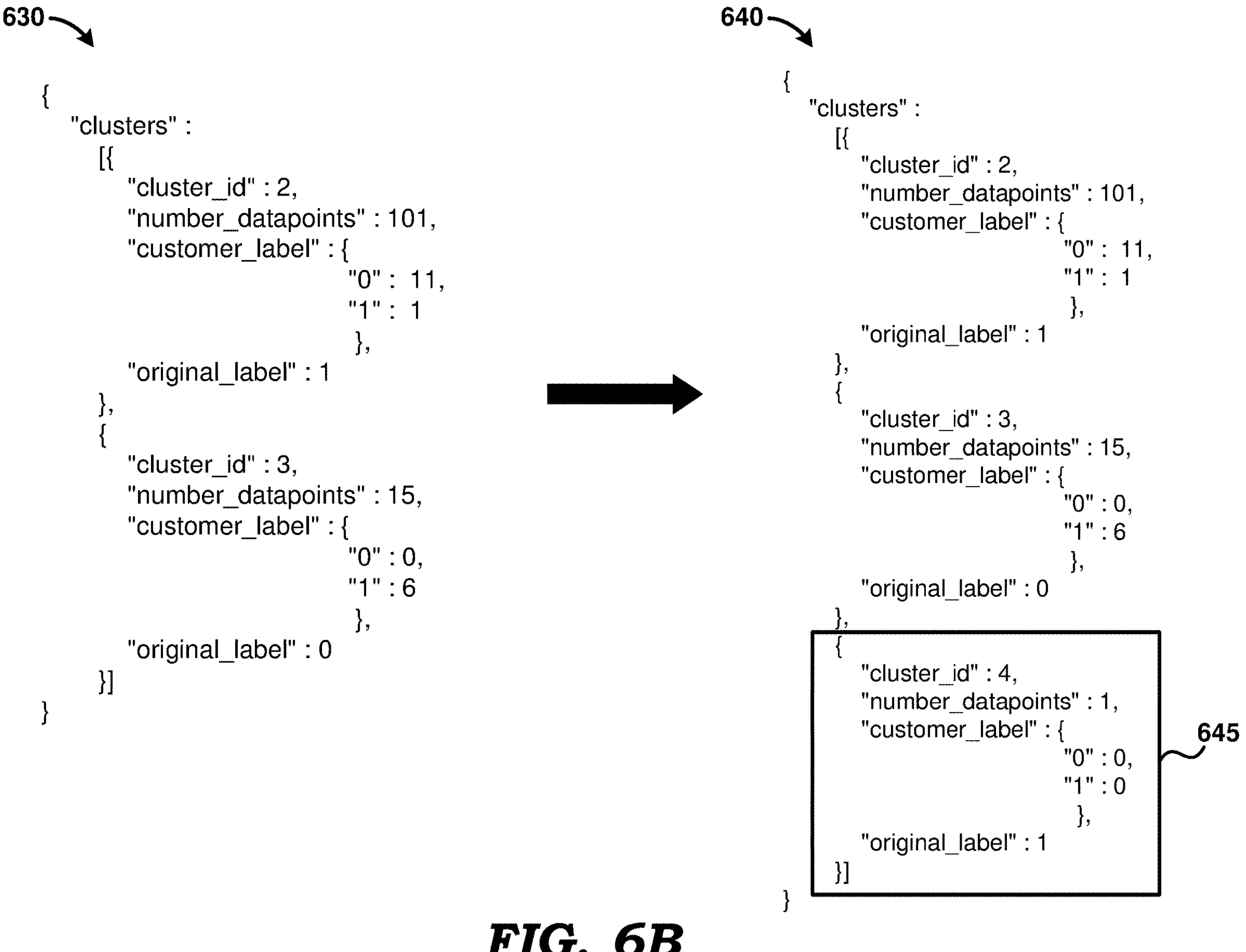
Figure 6C:
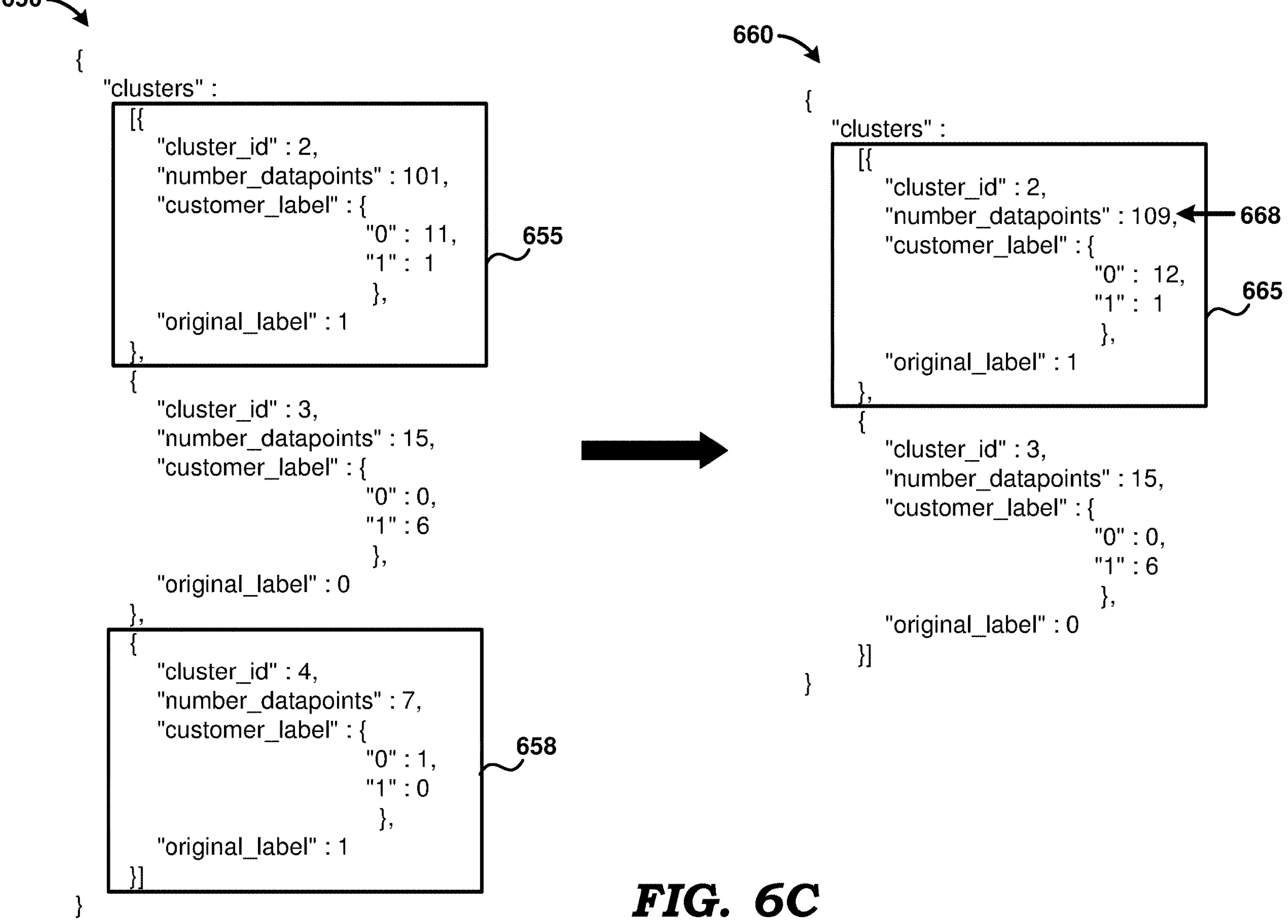

FIG. 6A-6C depicts the manner in which feedback data is updated when a new data item is added in one embodiment. Upon receipt of an indication that a new data item has been added, anomaly detector 150 (in particular, feedback processor 350) first determines a secondary cluster to which the data item belongs.

FIG. 6A illustrates the manner in which feedback data is updated when the secondary cluster (assumed to be the cluster with cluster_id="2") is contained in the set of secondary clusters (previously identified by using the second ML technique on the large set of data items) in one embodiment. Specifically, anomaly detector 150 adds the new data item to the existing secondary cluster. Data portion 610 depicts a portion of the feedback data prior to receiving the indication (of a new data item), while data portion 620 depicts the portions of the feedback updated with the new data item. The value "100" in data portion 615 is shown updated to the value "101" in data portion 625 to indicate that the new data item has been added to the existing secondary cluster with cluster_id="2".

FIG. 6B illustrates the manner in which feedback data is updated when the secondary cluster is not contained in the set of secondary clusters in one embodiment. Specifically, anomaly detector 150 adds a new secondary cluster to the feedback data and then add the new data item to the new secondary cluster. Data portion 630 depicts a portion of the feedback data prior to receiving the indication (of a new data item), while data portion 640 depicts the portions of the feedback updated with the new data item. Data portion 640 indicates that a new secondary cluster with cluster_id="4" has been added to the feedback data and also indicates that the new data item has been added to the new secondary cluster (the value "1" in data portion 645).

FIG. 6C illustrates the manner in which feedback data is updated when secondary clusters are merged in one embodiment. According to an aspect, anomaly detector 150 determines that an existing secondary cluster (assumed to be the cluster with cluster_id="2") is to be merged with one or more other existing secondary clusters (assumed to be the cluster with cluster_id="4"). Anomaly detector 150 then merges the one or more secondary clusters with the existing secondary cluster and adds the new data item to the merged secondary cluster. Data portion 650 depicts a portion of the feedback data prior to receiving the indication (of a new data item), while data portion 660 depicts the portions of the feedback updated with the new data item. Data portion 665 represents the merged cluster formed by merging the secondary cluster with cluster_id="4" (shown in data portion 658) with the secondary cluster with cluster_id="2" (shown in data portion 655). It may be observed that data portion 668 indicates that the number of data items in data portion 665 is the sum of the data items in the clusters of data portions 655 and 658 plus 1 to indicate that the new data item has been added to the merged secondary cluster with cluster_id="2".

Thus, anomaly detector 150 incorporates user feedback into the anomaly detection performed by unsupervised learning while also taking into consideration the addition of new data items without performing the unsupervised ML technique on the large set of data items (data set) again (that is without re-training).

It should be further appreciated that the features described above can be implemented in various embodiments as a desired combination of one or more of hardware, executable modules, and firmware. The description is continued with respect to an embodiment in which various features are operative when the software instructions described above are executed.

8. Digital Processing System

Figure 7:
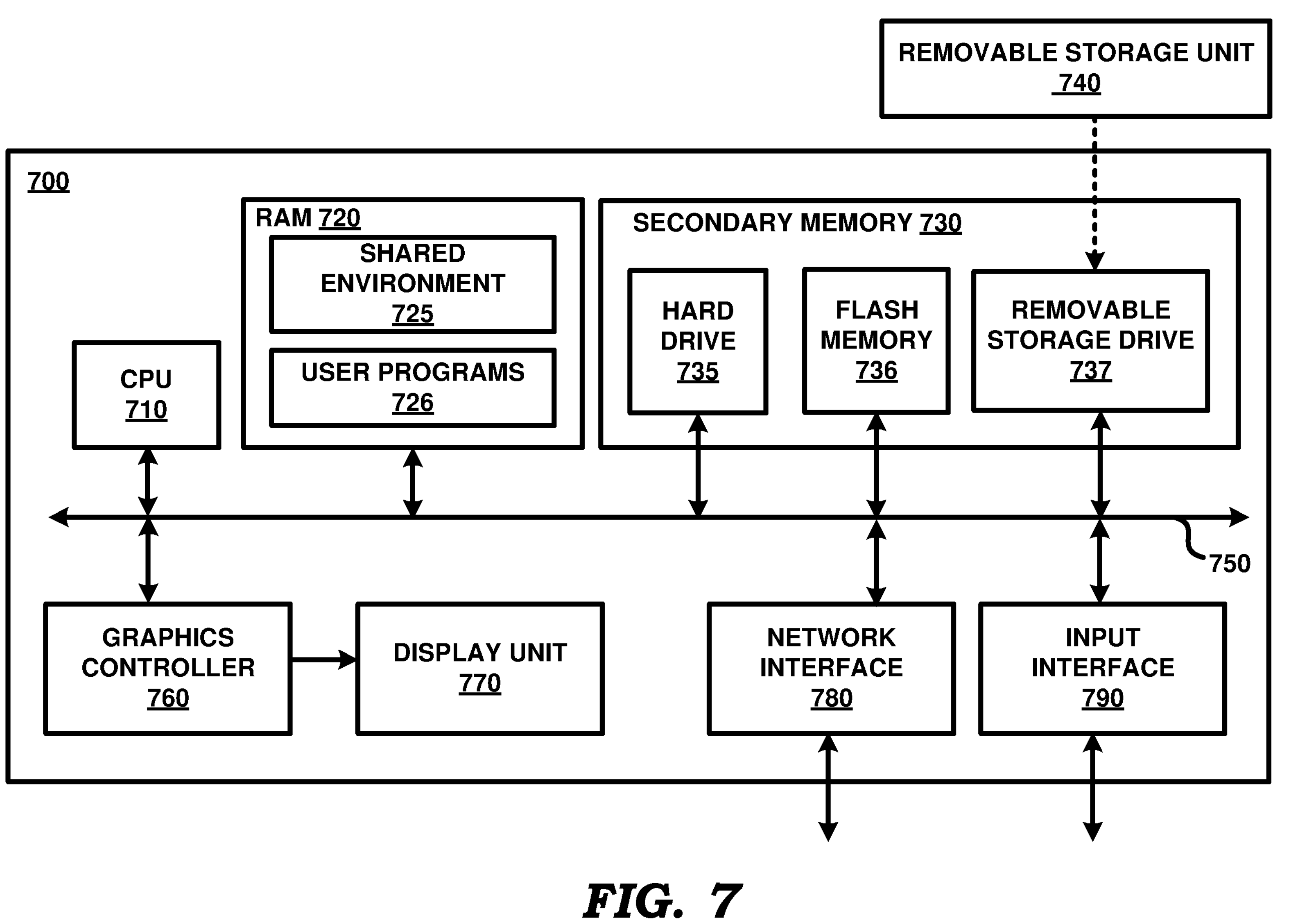
FIG. 7 is a block diagram illustrating the details of a digital processing system in which various aspects of the present disclosure are operative by execution of appropriate executable modules.

FIG. 7 is a block diagram illustrating the details of digital processing system (1300) in which various aspects of the present disclosure are operative by execution of appropriate executable modules. Digital processing system 700 may correspond to anomaly detector 150 (or any system implementing anomaly detector 150).

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the networks.

Secondary memory 730 may contain hard drive 735, flash memory 736, and removable storage drive 737. Secondary memory 730 may store the data (e.g., data portions of FIGS. 5A-5B and 6A-6C) and software instructions (e.g., for implementing the steps of FIG. 2, for implementing the blocks of FIG. 3), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 750. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method for classifying items as anomalous or non-anomalous, said method comprising:

performing a first machine learning (ML) technique on a large set of data items to identify a primary cluster containing data items classified as non-anomalous, with the rest of the data items classified as anomalous;

performing a second ML technique on said large set of data items to identify a set of secondary clusters;

receiving feedback on the classification of at least some of said large set of data items;

maintaining a feedback data associating said feedback with each secondary cluster of said set of secondary clusters;

receiving a first indication to find a classification of a first data item of said large set of data items;

identifying as a first result, whether said first data item is non-anomalous or anomalous based on whether said first data item belongs to said primary cluster or not;

determining, based on a first secondary cluster to which said first data item belongs and said feedback associated with said first secondary cluster, whether said first result is to be modified;

if said first result is to be modified and said first result is non-anomalous, changing said first result from non-anomalous to anomalous;

if said first result is to be modified and said first result is anomalous, changing said first result from anomalous to non-anomalous; and providing said first result as said classification for said first data item.

2. The method of claim 1, wherein said first ML technique comprises an unsupervised machine learning technique, wherein said maintaining, said determining and said changing together operate to incorporate feedback into said classification while using said unsupervised machine learning technique.

3. The method of claim 1, wherein said second ML technique operates to identify secondary clusters of smaller count of data items compared to the count of data items in said primary cluster.

4. The method of claim 1, wherein said feedback is received from one or more users, wherein said first indication comprises a first request received from a first user using a first end user system.

5. The method of claim 1, wherein said maintaining maintains for each of said set of secondary clusters, respective counts of anomalous and non-anomalous data items in the secondary cluster determined based on said feedback, wherein said determining comprises:

computing a ratio of said respective counts of said first secondary cluster to the total number of data items belonging to said first secondary cluster; and checking whether said ratio is above a threshold, wherein said determining determines that said first result is to be modified if said ratio is above or equal to said threshold and that said first result is not to be modified otherwise.

6. The method of claim 1, further comprising:

receiving a second indication that a second data item has been added to said large set of data items;

using said first ML technique to determine whether said second data item belongs to said primary cluster;

using said second ML technique to determine a second secondary cluster of said set of secondary clusters to which said second data item belongs; and updating said feedback data to include said second data item, wherein new data items are enabled to be added without said performing said first ML technique on said large set of data items again.

7. The method of claim 6, wherein said updating comprises:

checking whether said second secondary cluster is contained in said set of secondary clusters;

if said second secondary cluster is not contained in said set of secondary clusters, adding said second secondary cluster to said set of secondary clusters; and adding said second data item to said second secondary cluster.

8. The method of claim 6, wherein said updating comprises:

determining that said second data item causes said second secondary cluster to be merged with a third secondary cluster of said set of secondary clusters;

merging said third secondary cluster with said second secondary cluster; and adding said second data item to the merged said second secondary cluster.

9. A non-transitory machine-readable medium storing one or more sequences of instructions for classifying items as anomalous or non-anomalous, wherein execution of said one or more instructions by one or more processors contained in a digital processing system causes said digital processing system to perform the actions of:

performing a first machine learning (ML) technique on a large set of data items to identify a primary cluster containing data items classified as non-anomalous, with the rest of the data items classified as anomalous;

performing a second ML technique on said large set of data items to identify a set of secondary clusters;

receiving feedback on the classification of at least some of said large set of data items;

maintaining a feedback data associating said feedback with each secondary cluster of said set of secondary clusters;

receiving a first indication to find a classification of a first data item of said large set of data items;

identifying as a first result, whether said first data item is non-anomalous or anomalous based on whether said first data item belongs to said primary cluster or not;

determining, based on a first secondary cluster to which said first data item belongs and said feedback associated with said first secondary cluster, whether said first result is to be modified;

if said first result is to be modified and said first result is non-anomalous, changing said first result from non-anomalous to anomalous;

if said first result is to be modified and said first result is anomalous, changing said first result from anomalous to non-anomalous; and providing said first result as said classification for said first data item.

10. The non-transitory machine-readable medium of claim 9, wherein said first ML technique comprises an unsupervised machine learning technique, wherein said maintaining, said determining and said changing together operate to incorporate feedback into said classification while using said unsupervised machine learning technique.

11. The non-transitory machine-readable medium of claim 9, wherein said second ML technique operates to identify secondary clusters of smaller count of data items compared to the count of data items in said primary cluster, wherein said feedback is received from one or more users, wherein said first indication comprises a first request received from a first user using a first end user system.

12. The non-transitory machine-readable medium of claim 9, wherein said maintaining maintains for each of said set of secondary clusters, respective counts of anomalous and non-anomalous data items in the secondary cluster determined based on said feedback, wherein said determining comprises one or more instructions for:

computing a ratio of said respective counts of said first secondary cluster to the total number of data items belonging to said first secondary cluster; and checking whether said ratio is above a threshold, wherein said determining determines that said first result is to be modified if said ratio is above or equal to said threshold and that said first result is not to be modified otherwise.

13. The non-transitory machine-readable medium of claim 9, further comprising one or more instructions for:

receiving a second indication that a second data item has been added to said large set of data items;

using said first ML technique to determine whether said second data item belongs to said primary cluster;

using said second ML technique to determine a second secondary cluster of said set of secondary clusters to which said second data item belongs; and updating said feedback data to include said second data item, wherein new data items are enabled to be added without said performing said first ML technique on said large set of data items again.

14. The non-transitory machine-readable medium of claim 13, wherein said updating comprises one or more instructions for:

checking whether said second secondary cluster is contained in said set of secondary clusters;

if said second secondary cluster is not contained in said set of secondary clusters, adding said second secondary cluster to said set of secondary clusters; and adding said second data item to said second secondary cluster.

15. The non-transitory machine-readable medium of claim 13, wherein said updating comprises one or more instructions for:

determining that said second data item causes said second secondary cluster to be merged with a third secondary cluster of said set of secondary clusters;

merging said third secondary cluster with said second secondary cluster; and adding said second data item to the merged said second secondary cluster.

16. A digital processing system comprising:

a random access memory (RAM) to store instructions for classifying items as anomalous or non-anomalous; and one or more processors to retrieve and execute the instructions, wherein execution of the instructions causes the digital processing system to perform the actions of:

performing a first machine learning (ML) technique on a large set of data items to identify a primary cluster containing data items classified as non-anomalous, with the rest of the data items classified as anomalous;

performing a second ML technique on said large set of data items to identify a set of secondary clusters;

receiving feedback on the classification of at least some of said large set of data items;

maintaining a feedback data associating said feedback with each secondary cluster of said set of secondary clusters;

receiving a first indication to find a classification of a first data item of said large set of data items;

identifying as a first result, whether said first data item is non-anomalous or anomalous based on whether said first data item belongs to said primary cluster or not;

determining, based on a first secondary cluster to which said first data item belongs and said feedback associated with said first secondary cluster, whether said first result is to be modified;

if said first result is to be modified and said first result is non-anomalous, changing said first result from non-anomalous to anomalous;

if said first result is to be modified and said first result is anomalous, changing said first result from anomalous to non-anomalous; and providing said first result as said classification for said first data item.

17. The digital processing system of claim 16, wherein said first ML technique comprises an unsupervised machine learning technique, wherein said maintaining, said determining and said changing together operate to incorporate feedback into said classification while using said unsupervised machine learning technique.

18. The digital processing system of claim 16, wherein said second ML technique operates to identify secondary clusters of smaller count of data items compared to the count of data items in said primary cluster, wherein said feedback is received from one or more users, wherein said first indication comprises a first request received from a first user using a first end user system.

19. The digital processing system of claim 16, wherein said maintaining maintains for each of said set of secondary clusters, respective counts of anomalous and non-anomalous data items in the secondary cluster determined based on said feedback, wherein for said determining, said digital processing system performs the actions of:

computing a ratio of said respective counts of said first secondary cluster to the total number of data items belonging to said first secondary cluster; and checking whether said ratio is above a threshold, wherein said determining determines that said first result is to be modified if said ratio is above or equal to said threshold and that said first result is not to be modified otherwise.

20. The digital processing system of claim 16, further performing the actions of:

receiving a second indication that a second data item has been added to said large set of data items;

using said first ML technique to determine whether said second data item belongs to said primary cluster;

using said second ML technique to determine a second secondary cluster of said set of secondary clusters to which said second data item belongs; and updating said feedback data to include said second data item, wherein new data items are enabled to be added without said performing said first ML technique on said large set of data items again.

* * * * *